United States Patent [19]
Kawabata et al.

[11] Patent Number: 4,766,849
[45] Date of Patent: Aug. 30, 1988

[54] EGG COLLECTION SYSTEM

[75] Inventors: Kenji Kawabata, Matsuto; Takeshi Iwata, Ishikawa; Seizo Sakamoto, Ibaragi; Zenjiro Watanabe, Tondabayashi, all of Japan

[73] Assignees: Sekisui Jushi Kabushiki Kaisha; Hanshin Keiran Kabushiki Kaisha; Kabushiki Kaisha Daikyo, all of Osaka, Japan

[21] Appl. No.: 913,272

[22] Filed: Sep. 30, 1986

[30] Foreign Application Priority Data

Sep. 30, 1985 [JP] Japan ................................ 60-150776

[51] Int. Cl.⁴ ............................................. A01K 31/14
[52] U.S. Cl. ...................................................... 119/48
[58] Field of Search .................. 119/17, 45 R, 48, 21, 119/22; 198/699.1, 846, 847, 690.2

[56] References Cited

U.S. PATENT DOCUMENTS

| 874,982 | 12/1907 | Norton | 198/690.2 |
| 979,200 | 2/1905 | Prosser | 198/690.2 |
| 1,773,321 | 10/1928 | Schaffner | 198/847 X |
| 2,728,324 | 12/1955 | Radocy | 198/45 R |
| 3,685,494 | 8/1972 | Valli | 119/48 |
| 3,983,761 | 10/1976 | Stewart | 198/846 |
| 4,036,355 | 7/1977 | Valli | 198/607 |
| 4,311,474 | 1/1982 | Standley . | |

Primary Examiner—Robert P. Swiatek
Assistant Examiner—R. Thomas Price
Attorney, Agent, or Firm—Armstrong, Nikaido, Marmelstein & Kubovcik

[57] ABSTRACT

A system for collecting eggs of laying hens which includes a plurality of poultry cages encaging several laying hens, egg leading slopes causing eggs to roll out the poultry cages and a conveyor belt receiving and delivering eggs rolling from the cages, having retarding structure thereon for decreasing the rolling speed of the eggs.

8 Claims, 9 Drawing Sheets

EGG COLLECTION SYSTEM

BACKGROUND OF THE INVENTION

1. Field of the Invention

The present invention relates to egg collection systems for collecting eggs of laying hens, and more particularly to a system including a conveyor belt for carrying laid eggs to a collection area, which is capable of preventing or reducing the extent of breakage of an egg caused by collision of eggs or the like on the conveyor belt.

2. Description of the Prior Art

A conventional system for collecting eggs comprises a plurality of laying cages or nests each having a front wall defining an egg opening for discharging newly laid eggs, an inclined plane surface extended out beyond the front wall, and a flat surface conveyor belt receiving and delivering newly laid eggs rolling out by gravity from each of the cages or the nests, supported by a trough disposed in the front of each cage. The conveyor belt is driven at desired intervals to convey the eggs thereon to a collection area. However, in such conventional systems for collecting eggs, newly laid eggs are free to roll downwardly along the inclined plane surface from the cages and to fall down on the flat surfaced conveyor belt by gravity. That is to say, the rolling speed of eggs is not reduced. Therefore, a newly laid egg rolling from the cages and falling down to the conveyor belt can collide with an egg or eggs already on the conveyor belt, or a newly laid egg after dropping onto the conveyor belt often traverses and crosses the conveyor belt and impinges on the remote side wall of the trough, so that the egg breaks on the conveyor belt. Such breakage of the eggs amounts to about 6 to 10 percent per a day of all production in an ordinary poultry farm, and is a serious problem especially for poultry farms handling expensive eggs. Furthermore, the conveyor belt and the trough are soiled by such breakage.

SUMMARY OF THE INVENTION

Accordingly, the present invention is provided to overcome the prior art problems, and has for its object an egg collection system which is capable of reducing the percentage of breakage of laid eggs by preventing collision of eggs on a conveyor belt or absorbing a shock of collision of eggs.

Another object of the present invention is to provide an egg collection system that is capable of reducing the percentage of breakage of laid eggs by preventing collision of an egg with a remote side wall of the a trough supporting a conveyor belt or absorbing a shock of impingement of an egg on said remote side wall by interrupting transverse movement of an egg across the conveyor belt.

A further object of the present invention is to provide an egg collection system in which laid eggs will assume a non-rolling longitudinal alignment for smooth transfer to a collection area, with no possibility of any egg bumping against the both side walls of the trough.

Still a further object of the present invention is to provide an egg collection system in which it is possible to sweep feathers, droppings, dirt and the like accumulated at a gap between the front end of each extended portion of one of inclined plane surfaces and the trough or at both the gap and a remote side wall of the trough.

The above and further objects, features and advantages of the invention will more fully appear from the following description with reference to the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
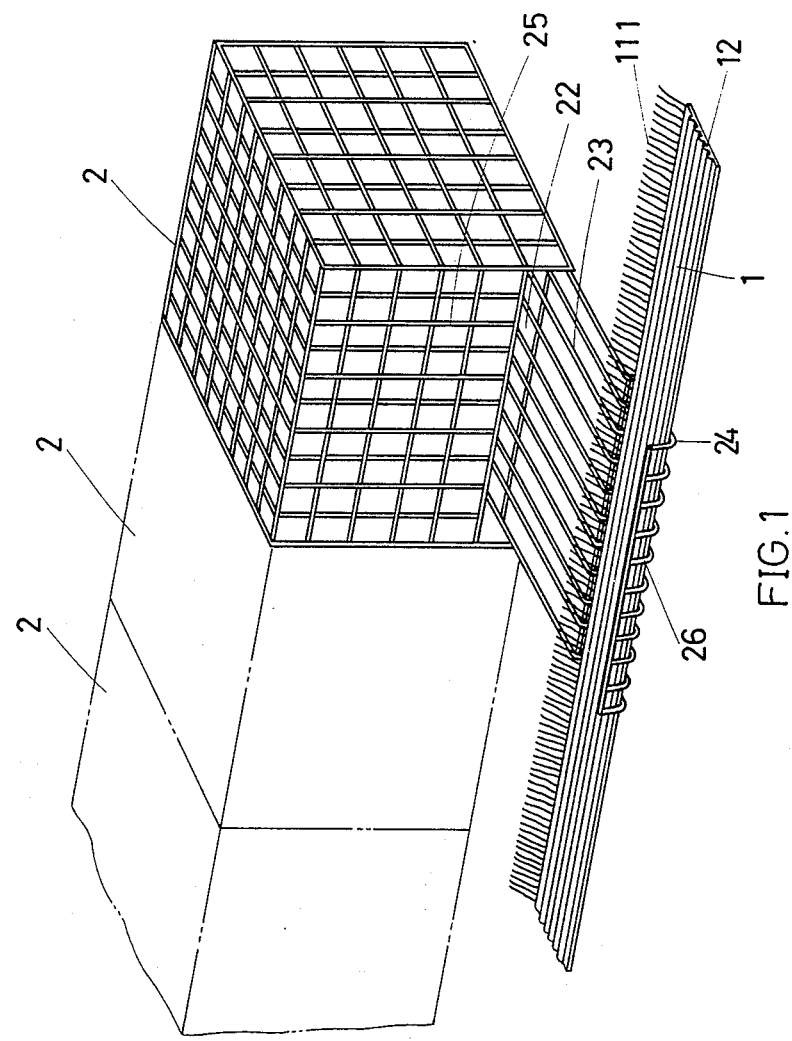
FIG. 1 is a schematic perspective view of a portion of an egg collection system according to the present invention.

A schematic perspective illustration of an egg collection system of the present invention is presented in FIG. 1 wherein the system generally includes a plurality of poultry cages 2 arranged side by side in longitudinal alignment on the same horizontal plane, each cage 2 having a front wall 25 with an egg aperture 22 at the lower part thereof and having an inclined floor 21, egg leading slopes 23 each provided by elongating forwardly and slightly downwardly the floor 21 of the cage 2 beyond the egg aperture 22, a trough 24 disposed at the end of each of the egg leading slopes 23, and a conveyor belt 1 for receiving laid eggs 3 rolling out along the egg leading slopes 23 and delivering them, which is supported movably along the longitudinal direction.

The poultry cages 2 are built with wire mesh with a capacity to engage several laying hens. Each floor 21 of the poultry cages 2 is slightly inclined downwardly toward the lower edge of the front wall 25 for causing newly laid eggs to roll out of the cage 2. Each front wall 25 has an egg aperture 22 at lower part thereof for permitting the free passage of eggs 3 from the cage 2.

The egg leading slopes 23 respectively are extended slightly downwardly and forwardly from the egg apertures 22 being in line with the inclined floors 21 of the poultry cages 2.

The trough 24 for supporting the conveyor belt 1 is provided at the end of each egg leading slopes 23 in parallel to the poultry cages 2, and has an upwardly turned vertical confining side wall 26 for maintaining eggs on the conveyor belt 1.

Figure 2:
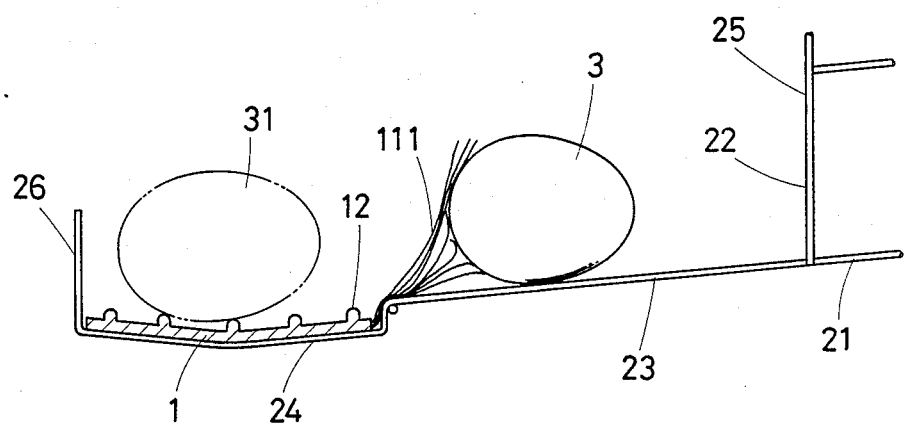
FIG. 2 is a partly sectional fragmentary schematic view of the system shown in FIG. 1, particularly illustrating an egg leading slope, a trough and a conveyor belt having retard means at one side adjacent to the slope.
Figure 5:
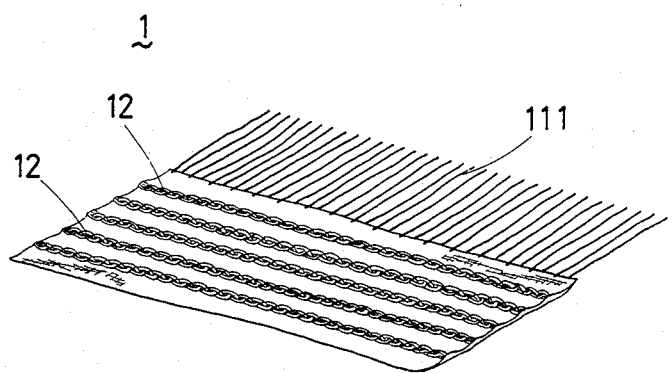
FIGS. 5 to 9, inclusive, are partial perspective views of the conveyor belt having the retard means at one side thereof employed in the system of FIG. 1, showing various modifications.
Figure 6:
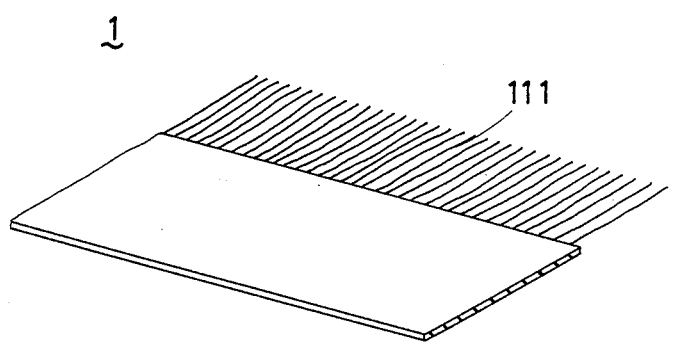
Figure 7:
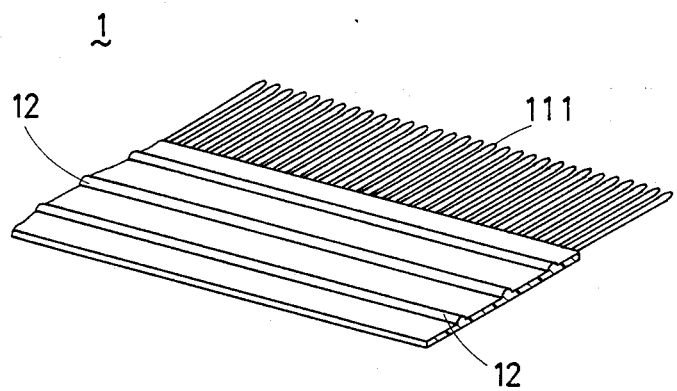
Figure 8:
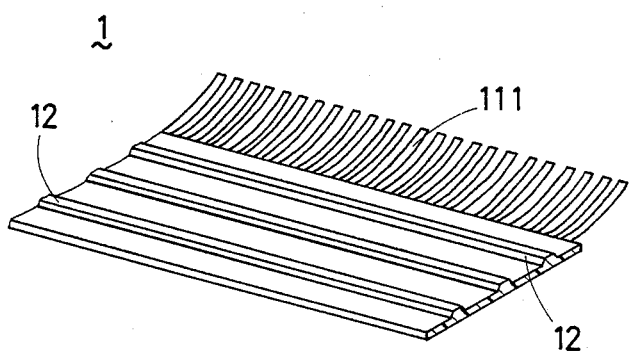
Figure 9:
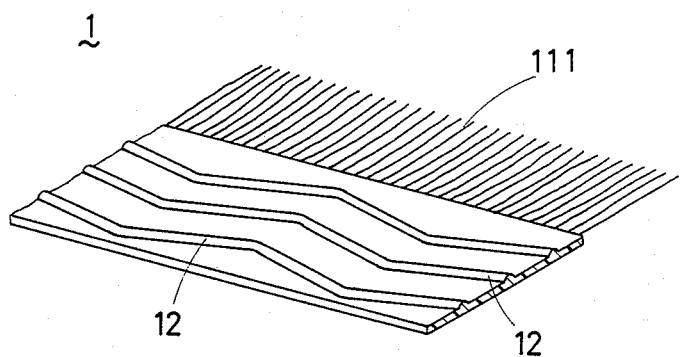

The conveyor belt 1 is flat and has a retard means 111 at one side thereof adjacent to the egg leading slopes 23. The retard means 111 is for engaging eggs 3 discharged from the cages 2 and effectively decreasing the rolling speed thereof when the eggs 3 drop onto the conveyor belt 1. A plain fabrics belt made of synthetic fiber, e.g., polyethylene fiber, polypropylene fiber, polyester fiber, nylon fiber or the like; a plastic belt made of aforementioned synthetic resin; or a rubber belt may be employed as the belt 1. The retard means 111 is made of the same material as the belt 1, and can assume various forms. In FIGS. 5, 6, and 9, the retard means 111 is formed by many straight threads or monofilaments. Referring to FIG. 7, the retard means 111 can be formed by many loops. In FIG. 8, the retard means 111 can be formed by many strips. Such retard means 111 is disposed at the one side adjacent to the egg leading slopes 23 along the overall length of the conveyor belt 1, and overhangs the egg lending slopes 23 about 10 to 60 mm, as shown in FIG. 2 in the direction towards the cages 2. The retard means 111 has flexibility and may be made separately from the manufacture of the conveyor belt 1 and then attached to the belt 1 by bonds, adhesives, fusion or other suitable ways, or may be made simultaneously with the production of the belt 1. In the case when the belt 1 is a plain fabric belt, the retard means 111 may be provided by elongating the threads that run crosswize of the fabric belt as shown in FIG. 5. Referring to FIG. 6, the upper surface of the conveyor belt 1 is merely flat. But it is understood that a small number of ribs 12 may be arranged longitudinally on the upper surface of the belt 1 with adequate separations in order to cause the eggs 3 to position themselves between the ribs 12, as shown in FIGS. 5, 7, 8, and 9. In that case the ribs 12 cushion the fall of the eggs 3 from the egg leading slopes 23 and cause the eggs promptly to become longitudinally aligned so that the breakage of the eggs is favorably prevented. The ribs 12 are made of the same material as the conveyor belt 1, and may be made separately from the production of the belt 1 and then attached to the upper surface thereof by bonds, adhesives, fusion or other suitable ways, or may be made simultaneously with the manufacture of the belt 1. Each of the ribs 12 assumes various shapes such as, e.g., a twisted string as shown in FIG. 5, a rope-shape (not shown), a semicircle in cross section as shown in FIG. 7, a square in cross section as shown in FIG. 8 or the like, and is arranged longitudinally in a straight line paralleling each other or is wound at equal distances along the longitudinal direction, as shown in FIG. 9. In the case when the conveyor belt 1 is a plain fabrics belt, each of twisted strings formed as a rib 12 may be woven into the belt 1 simultaneously with the production thereof. The number of the ribs 12 are generally from 2 to 10, and preferably from 3 to 6.

In the system described above, the conveyor belt 1 is movably supported by the trough 24, and is generally operated by conventional drive means (not shown) only at a certain time of the day.

In the egg collection system disclosed above, newly laid eggs 3 will roll on the inclined floor 21 of the poultry cage 2 by gravity toward the front of the cage 2, and then will pass through the egg aperture 22. The eggs 3 continue their forward rolling along the egg leading slope 23 by gravity and then they will touch the retard means 111, as shown in FIG. 2, whereby the rolling speed of eggs 3 is reduced by the retard means 111 and the eggs 3 will safely and softly drop onto the conveyor belt 1, pushing aside the retard means 111. When a formerly laid egg, as shown at 31 in FIG. 2, lies on the belt 1, the rolling speed of the egg 3 discharged from the poultry cage 2 is decreased by the retard means 111 so that, even if newly laid egg 3 collides with the egg 31 lying on the belt 1, the shock of this collision is softened, thereby effectively preventing the breakage of the eggs. In the case that the ribs 12 are arranged on the surface of the belt 1, the transverse movement of the egg 3 thereon is interrupted and the egg 3 stops between the ribs 12. Accordingly, all of the eggs do not gather at one side of the belt and they are longitudinally aligned by the ribs 12 for smooth transfer to a collection area (not shown).

Figure 3:
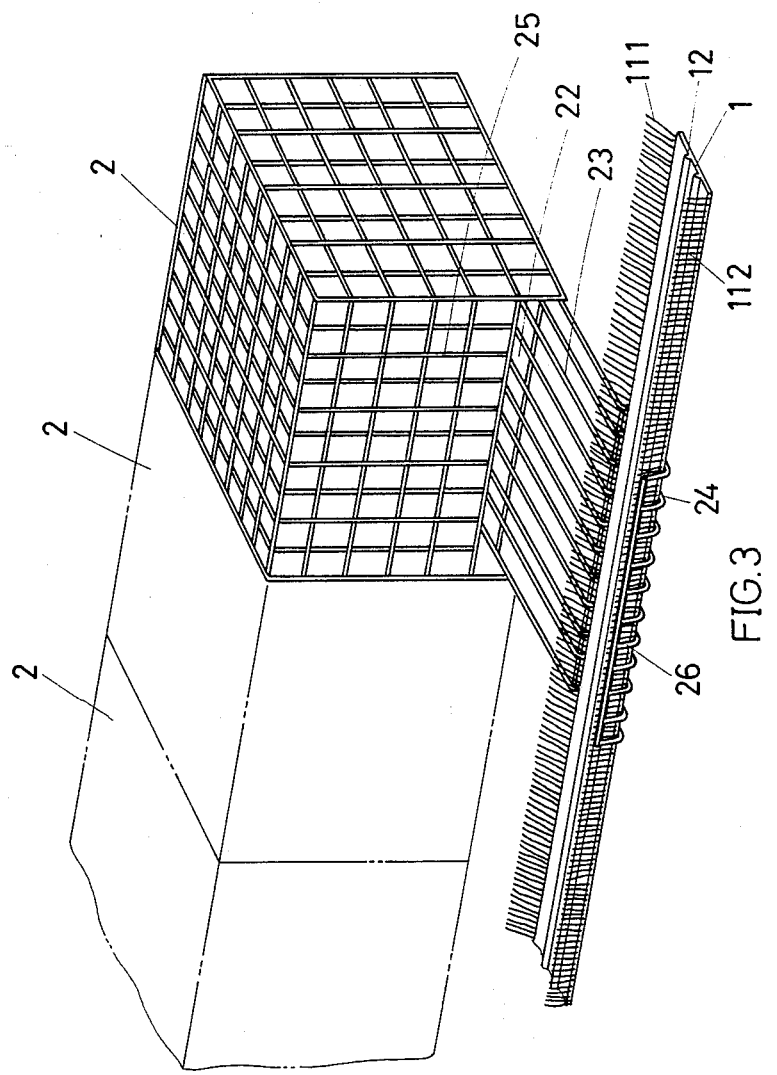
FIG. 3 is a schematic perspective view of a portion of another egg collection system according to the present invention.
Figure 4:
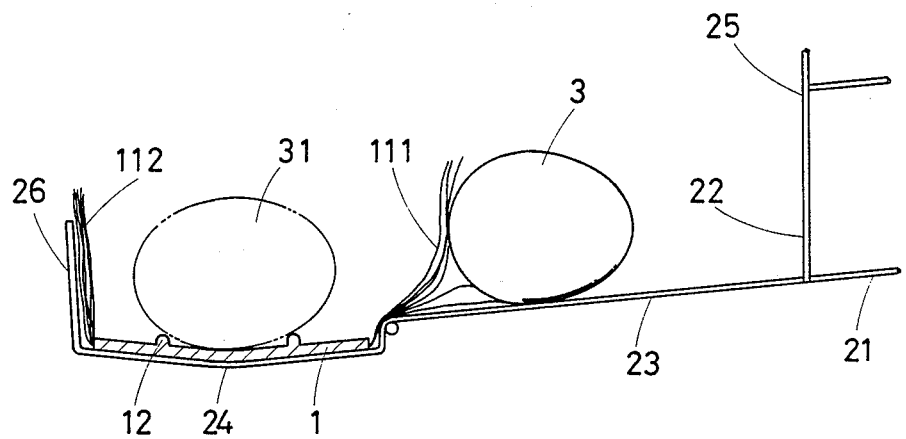
FIG. 4 is a partly sectional, fragmentary schematic view of the system shown in FIG. 3, particularly illustrating an egg leading slope, a trough and a conveyor belt having retard means at the one side and cushion means at the other side of the conveyor belt.
Figure 10:
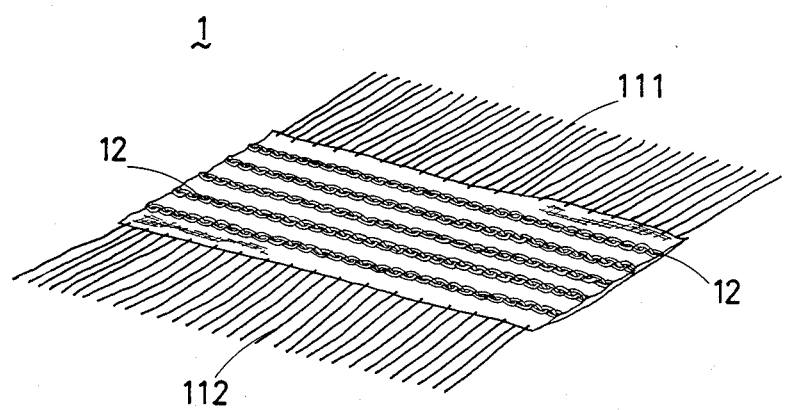
FIGS. 10 to 14, inclusive, are partial perspective views of the conveyor belt having the retard means at one side and the cushion means at the other side thereof employed in the system of FIG. 3, showing various modifications.
Figure 11:
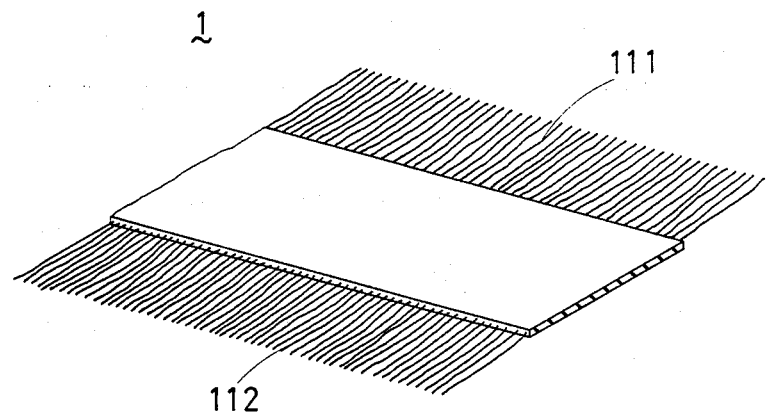
Figure 12:
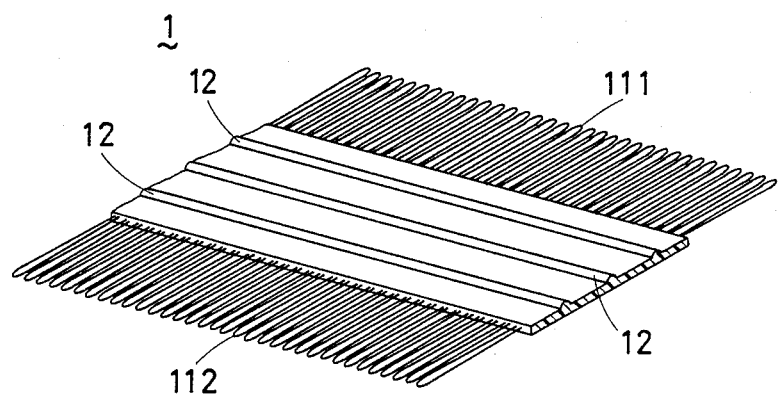
Figure 13:
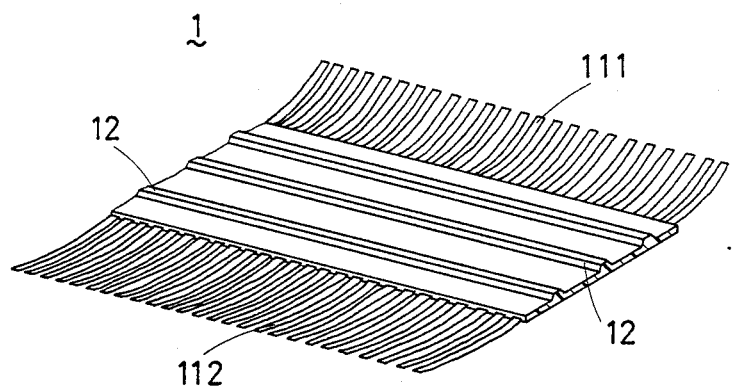
Figure 14:
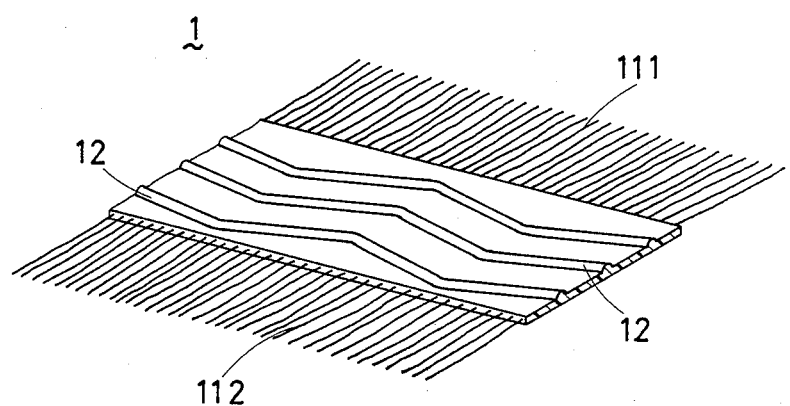

In the other embodiment of the present invention shown in FIGS. 3 and 4, the conveyor belt 1 has the aforementioned retard means 111 at the one side thereof adjacent to the egg leading slopes 23 and cushion means 112 at the opposite side. This cushion means 112 is for absorbing a shock of the impingement of eggs on the side wall 26. The cushion means 112 is made of the same material and in the same manner as the retard means 111. The upper surface of the belt 1 may be flat or a small number of ribs 12 may be arranged on the upper surface of the belt 1. FIGS. 10 to 14 show various modifications of the conveyor belt 1 employed by this system. In FIG. 10, the belt 1 is a plain fabrics belt having several ribs 12, and both the retard means 111 and the cushion means 112 arranged at each side are formed by elongating the threads thereof that run crosswise of the fabric belt. In FIG. 11, the belt 1 is a flat surfaced belt and both the retard means 111 and the cushion means 112 disposed at each side are formed by many straight flexible threads or monofilments. FIG. 12 shows the belt 1 having several ribs 12 thereon, the retard means 111 at the one side and the cushion means 112 at the other side, in which both means 111 and 112 are formed by many loops. The belt 1 shown in FIG. 13 has several ribs 12 thereon, in which both retard means 111 and cushion means 112 arranged at each side thereof are formed by many strips. In FIG. 14, the several ribs 12 arranged on the upper surface of the belt 1 are wound at equal distance along the longitudinal direction, and both the retard means 111 and the cushion means 112 are formed by many threads or monofilaments.

In the system described above, referring to FIGS. 3 and 4, the retard means 111 arranged at the one side of the conveyor belt 1 overhangs the egg leading slopes 23 in the direction of the cages 2 and the cushion means 112 rises along the side wall 26 of the trough 24. The conveyor belt 1 is movably supported by the trough 24, and is generally operated by conventional drive means (not shown) only at a certain time of the day.

In the operation of the system as shown in FIGS. 3 and 4, newly laid eggs 3 will roll on the inclined floor 21 of the poultry cage 2 by gravity toward the front of the cage 2, and then will pass through the egg aperture 22. The eggs 3 continue their forward rolling on the egg leading slope 23 and then they will touch the retard means 111, as shown in FIG. 4, whereby the rolling speed of eggs 3 is decreased by the retard means 111 and the eggs 3 will safely and softly fall down to the conveyor belt 1, pushing aside the retard means 111. When a formerly laid egg, as shown at 31 in FIG. 4, lies on the belt 1, the rolling speed of the egg 3 rolling out from the poultry cage 2 is reduced as mentioned above by the retard means 111 so that, even if newly laid egg 3 collides with the egg 31 lying on the belt 1, the shock of this collision is softened, thereby effectively preventing the breakage of the eggs. Furthermore, even if the eggs continue their rolling toward the side wall 26 of the trough 24, the shock of the impingement of the eggs of the side wall 26 is absorbed by the cushion means 112.

As described above, according to the invention, the rolling speed of newly laid eggs discharged from the poultry cages can be effectively decreased by the retard means where the eggs drop onto the belt. In this manner, even if the newly laid eggs collide with eggs laying on the conveyor belt, this shock of the collision is effectively softened, so that the breakage of the eggs can be prevented. When the conveyor belt has the cushion means, the shock of the impingement of the eggs on the side wall of the trough can be absorbed by the cushion means, thereby more effectively preventing the breakage of the eggs. Additionally, the trough and the conveyor belt can be protected from being soiled by the breakage of the eggs. Also, when the ribs are arranged on the surface of the belt, the transverse movements of the eggs on the conveyor belt can be effectively interrupted so that the eggs stop and position themselves between the ribs, whereby all of the eggs do not gather at one side of the belt and are longitudinally aligned by the ribs. Consequently, the safe and smooth delivering of the eggs to a collection area with no possibility of any egg bumping against the both side walls of the trough can be performed. Furthermore, when the conveyor belt is operated, the gap between the end of the egg leading slope and the trough, or both said gap and the side wall of the trough when the cushion means are arranged at the remote side of the belt, is rubbed by the retard means and the cushion means respectively, thereby feathers, droppings, dirt and the like accumulated at such portion are effectively swept away.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. An egg collection system for collecting eggs of laying hens comprising: a plurality of laying cages arranged side by side in longitudinal alignment on the same horizontal plane, each said laying cage having a front wall with an egg aperture at a lower part thereof, an inclined floor and an egg leading slope provided by elongating forwardly and slightly downwardly said floor of said laying cage beyond said egg aperture, a trough disposed at the end of each of said egg leading slopes, each said trough having an upwardly turned vertical confining side wall at a side remote from said egg leading slopes, and a conveyor belt for receiving laid eggs rolling out along said egg leading slopes and movably supporting and delivering said eggs along a longitudinal direction of said troughs, said belt having retard means along the entire length of one side of said belt adjacent to said egg leading slopes and overhanging said egg leading slopes for engaging eggs discharged from said laying cages and effectively decreasing the rolling speed of said eggs while permitting said eggs to drop from said egg leading slopes onto said conveyor belt.

2. An egg collection system as defined in claim 1, wherein cushion means for absorbing the shock of said eggs impinging against said side wall of said trough is disposed at the other side of said conveyor belt.

3. An egg collection system as defined in claim 2, wherein several ribs are arranged in the longitudinal direction on the upper surface of said conveyor belt with adequate separations to permit said eggs to position themselves between said ribs.

4. An egg collection system as defined in claim 1, wherein several ribs are arranged in the longitudinal direction on the upper surface of said conveyor belt with adequate separtion to permit said eggs to position themselves between said ribs.

5. An egg collection system for collecting eggs of laying hens comprising: a plurality of laying cages arranged side by side in longitudinal alignment on the same horizontal plane, each said laying cage having a front wall with an egg aperture at a lower part thereof, an inclined floor, and an egg leading slope provided by elongating forwardly and slightly downwardly said floor of said laying cage beyond said egg aperture, a trough disposed at the end of each of said egg leading slopes, each said trough having an upwardly turned vertical confining side wall at a side remote from said egg leading slopes, and a conveyor belt for receiving laid eggs rolling out along said egg leading slopes and movably supporting and delivering said eggs along a longitudinal direction of said troughs, said belt comprising a fabric belt made of synthetic fiber with threads that run crosswise and having a plurality of spaced ribs extending longitudinally along the upper surface thereof, said threads that run crosswise being elongate at one side of said belt adjacent to said egg leading slopes thereby providing retard means along the entire length of one side of said belt adjacent to said egg leading slopes for engaging eggs discharged from said laying cages and effectively decreasing the rolling speed of said eggs as said eggs drop from said egg leading slopes onto said conveyor belt.

6. An egg collection system for collecting eggs of laying hens comprising: a plurality of laying cages arranged side by side in longitudinal alignment on the same horizontal plane, each said laying cage having a front wall with an egg aperture at a lower part thereof, an inclined floor and an egg leading slope provided by elongating forwardly and slightly downwardly said floor of said laying cage beyond said egg aperture, a trough disposed at the end of each of said egg leading slopes, each said trough having an upwardly turned vertical confining side wall at a side remote from said egg leading slopes, and a conveyor belt for receiving laid eggs rolling out along said egg leading slopes and movably supporting and delivering said eggs along a longitudinal direction of said troughs, said belt comprising a fabric belt made of synthetic fiber with threads that run crosswise and having a plurality of spaced ribs extending longitudinally along the upper surface thereof, said threads that run crosswise being elongated at both sides of said belt thereby providing retard means along the entire length of said one side of said belt adjacent to said egg leading slopes for engaging eggs discharged from said laying cages and effectively decreasing the rolling speed of said eggs as said eggs drop from said egg leading slopes onto said conveyor belt and cushion means along said side wall of said trough at a second side of said belt for absorbing the shock of said eggs impinging against said side wall of said trough.

7. An egg collection system for collecting eggs of laying hens comprising: a plurality of laying cages arranged side by side in longitudinal alignment on the same horizontal plane, each said laying cage having a front wall with an egg aperture at a lower part thereof, an inclined floor, and an egg leading slope provided by elongating forwardly and slightly downwardly said floor of said laying cage beyond said egg aperture, a trough disposed at the end of each of said egg leading slopes, each said trough having an upwardly turned vertical confining side wall at a side remote from said egg leading slopes, and a conveyor belt for receiving laid eggs rolling out along said egg leading slopes and movably supporting and delivering said eggs along a longitudinal direction of said troughs, said belt comprising a fabric belt made of synthetic fiber with threads that run crosswise, said threads that run crosswise being elongated at one side of said belt adjacent to said egg leading slopes thereby providing retard means along the entire length of one side of said belt adjacent to said egg leading slopes for engaging eggs discharged from said laying cages and effectively decreasing the rolling speed of said eggs as said eggs drop from said egg leading slopes onto said conveyor belt.

8. An egg collection system for collecting eggs of laying hens comprising: a plurality of laying cages arranged side by side in longitudinal alignment on the same horziontal plane, each said laying cage having a front wall with an egg aperture at a lower part thereof, an inclined floor and an egg leading slope provided by elongating forwardly and slightly downwardly said floor of said laying cage beyond said egg aperture, a trough disposed at the end of each of said egg leading slopes, each said trough having an upwardly turned vertical confining side wall at a side remote from said egg leading slopes, and a conveyor belt for receiving laid eggs rolling out along said egg leading slopes and movably supporting and delivering said eggs along a longitudinal direction of said troughs, said belt comprising a fabric belt made of synthetic fiber with threads that run crosswise, said threads that run crosswise being elongated at both sides of said belt thereby providing retard means along the entire length of one side of said belt adjacent to said egg leading slopes for engaging eggs discharged from said laying cages and effectively decreasing the rolling speed of said eggs as said eggs drop from said egg leading slopes onto said conveyor belt and cushion means along said side wall of said trough at a second side of said belt for absorbing the shock of said eggs impinging against said side wall of said trough.

* * * * *